(12) United States Patent  
Mishra

(10) Patent No.: US 11,132,405 B2  
(45) Date of Patent: *Sep. 28, 2021

(54) METHOD OF IDENTIFYING TEMPORAL DEMAND OF QUERIES AND METADATA TO GIVE BETTER AUTOCOMPLETE QUERIES AND IMPROVED SEARCH RESULTS

(71) Applicant: eBay Inc., San Jose, CA (US)

(72) Inventor: Shrish Mishra, Mountain View, CA (US)

(73) Assignee: eBay Inc., San Jose, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/296,495

(22) Filed: Mar. 8, 2019

(65) Prior Publication Data

US 2019/0228038 A1 Jul. 25, 2019

Related U.S. Application Data

(63) Continuation of application No. 14/869,541, filed on Sep. 29, 2015, now Pat. No. 10,268,778.

(Continued)

(51) Int. Cl.
*G06F 17/00* (2019.01)
*G06F 16/9032* (2019.01)
*G06F 16/9535* (2019.01)

(52) U.S. Cl.
CPC .... *G06F 16/90328* (2019.01); *G06F 16/9535* (2019.01)

(58) Field of Classification Search
CPC .. G06F 16/164; G06F 16/1824; G06F 16/137; G06F 16/156; G06F 16/119;
(Continued)

(56) References Cited

U.S. PATENT DOCUMENTS 6,564,213 B1 5/2003 Ortega et al.
9,305,092 B1 4/2016 Finkelstein et al.
(Continued)

FOREIGN PATENT DOCUMENTS

CN 101196885 A 6/2008
CN 101681198 A 3/2010
(Continued)

OTHER PUBLICATIONS

Notice of Allowance received for Korean Patent Application No. 10-2019-7030237, dated Jul. 13, 2020, 3 pages (2 pages of official copy & 1 page of English translation).
(Continued)

*Primary Examiner* — Greta L Robinson
(74) *Attorney, Agent, or Firm* — Holland & Hart LLP

(57) ABSTRACT

Embodiments describe systems and methods for identifying temporal demand for queries and using metadata to modify autocomplete results. In one embodiment, a record of historical queries is stored by a system and analyzed to identify periodic or repeated events where demand for autocomplete results associated with one or more categories deviates from normal demand. A temporal model based on this record is used to adjust autocomplete search results during subsequent time periods associated with the repeated events.

20 Claims, 13 Drawing Sheets

Related U.S. Application Data

(60) Provisional application No. 62/057,548, filed on Sep. 30, 2014.

(58) Field of Classification Search
CPC ...... G06F 16/144; G06F 16/31; G06F 3/0647; G06F 3/067; G06F 16/90328; G06F 16/9535
See application file for complete search history.

(56) References Cited

U.S. PATENT DOCUMENTS

| | | | |
|---|---|---|---|
| 10,268,778 | B2 | 4/2019 | Mishra |
| 2007/0050339 | A1 | 3/2007 | Kasperski et al. |
| 2008/0162506 | A1 | 7/2008 | Stephenson et al. |
| 2009/0094145 | A1 | 4/2009 | Kim et al. |
| 2009/0119289 | A1 | 5/2009 | Gibbs et al. |
| 2011/0161182 | A1 | 6/2011 | Racco |
| 2012/0310973 | A1 | 12/2012 | Zhong et al. |
| 2014/0108445 | A1* | 4/2014 | Oztekin ............ G06F 16/90324 707/767 |
| 2014/0136543 | A1* | 5/2014 | Frieden ............ G06F 16/90324 707/741 |
| 2014/0280291 | A1* | 9/2014 | Collins ............ G06F 16/90324 707/767 |
| 2015/0149482 | A1 | 5/2015 | Finkelstein et al. |
| 2015/0169578 | A1* | 6/2015 | Taropa ............ G06F 16/90324 707/723 |
| 2016/0092598 | A1 | 3/2016 | Mishra |

FOREIGN PATENT DOCUMENTS

| | | |
|---|---|---|
| CN | 102867011 A | 1/2013 |
| CN | 103646089 A | 3/2014 |
| KR | 10-2013-0023977 A | 3/2013 |
| WO | 2004/023243 A2 | 3/2004 |
| WO | 2012/156893 A1 | 11/2012 |
| WO | 2016/053990 A1 | 4/2016 |

OTHER PUBLICATIONS

Response to Office Action filed on Apr. 28, 2020 for Chinese Patent Application No. 201580053209.7, dated Feb. 3, 2020, 50 pages (42 pages of official copy & 8 pages of English Translation of claims).
Office Action received for Korean Patent Application No. 10-2019-7030237, dated Jan. 14, 2020, 7 pages (4 Pages of Official Copy and 3 pages of English Translation).
Response to Office Action filed on Mar. 16, 2020 for Korean Application No. 10-2019-7030237, dated Jan. 14, 2020, 29 pages (24 pages of official copy & 5 pages of English Translation of claims).
Office Action received for Chinese Patent Application No. 201580053209.7, dated Feb. 3, 2020, 11 Pages (6 pages of Official Copy and 5 pages of English Translation).
Applicant Initiated Interview Summary received for U.S. Appl. No. 14/869,541, dated Jun. 6, 2018, 4 pages.
Communication Pursuant to Article 94(3) EPC received for European Patent Application No. 15846998.1 , dated Jan. 11, 2019, 9 pages.
Corrected Notice of Allowability received for U.S. Appl. No. 14/869,541, dated Jan. 23, 2019, 2 pages.
Final Office Action received for Korean Patent Application No. 10-2017-7011806, dated Apr. 26, 2019, 5 pages (2 pages of English Translation and 3 pages of Official Copy).
First Action Interview—Office Action Summary received for U.S. Appl. No. 14/869,541, dated Mar. 5, 2018, 3 pages.
International Preliminary Report on Patentability received for PCT Application No. PCT/US2015/052862, dated Apr. 13, 2017, 10 pages.
Notice of Acceptance received for Australian Patent Application No. 2015324030, dated Jan. 10, 2018, 3 pages.
Notice of Allowance received for Canada Patent Application No. 2,961,952, dated Aug. 23, 2018, 1 page.
Notice of Allowance received for U.S. Appl. No. 14/869,541, dated Jan. 3, 2019, 12 pages.
Pre-Interview First Action—Office Action Summary received for U.S. Appl. No. 14/869,541, dated Nov. 8, 2017, 5 pages.
Response to Communication Pursuant to Article 94(3) EPC filed on Apr. 26, 2019, for European Patent Application No. 15846998.1, dated Jan. 11, 2019, 14 pages.
Response to First Action Interview—Office Action Summary filed on Oct. 31, 2018, for U.S. Appl. No. 14/869,541, dated Mar. 5, 2018, 15 pages.
Response to Extended European Search report filed on Nov. 9, 2018, for European Patent Application No. 15846998.1, dated Jul. 26, 2018, 17 pages.
Response to First Action Interview—OA Summary filed on Jul. 3, 2018, for U.S. Appl. No. 14/869,541 , dated Mar. 5, 2018, 14 pages.
Notice of Allowance received for Korean Patent Application No. 10-2017-7011806, dated Jul. 18, 2019, 3 pages (2 pages of Official copy and 1 page of English Translation).
Response to Office Action Filed on Jun. 28, 2019, for Korean Patent Application No. 10-2017-7011806 ,dated Apr. 26, 2019, 13 pages(8 pages of English Translation and 5 pages of Official Copy).
Summons to Attend Oral Proceedings Received for European Patent Application No. 15846998.1, mailed on Sep. 2, 2019, 7 pages.
Radinsky et al., "Behavioral Dynamics on the Web: Learning, Modeling, and Prediction", ACM Transactions on Information Systems (TOIS), Retrieved from <http://research.microsoft.com/en-us/um/people/sdumais/TOIS2013-a-16-radinsky.pdf>, Jul. 2013, 37 pages.
Extended European Search Report received for European Patent Application No. 15846998.1, dated Jan. 26, 2018, 11 pages.
First Examination Report received for Australian Patent Application No. 2015324030, dated Oct. 30, 2017, 2 pages.
International Search Report received for PCT Patent Application No. PCT/US2015/052862, dated Dec. 21, 2015, 2 pages.
International Written Opinion received for PCT Patent Application No. PCT/US2015/052862, dated Dec. 21, 2015, 8 pages.
Office Action received for Canadian Patent Application No. 2,961,952, dated Feb. 1, 2018, 4 pages.
Office Action received for Korean Patent Application No. 10-2017-7011806, dated Oct. 25, 2018, 14 pages.
Response to Office Action filed on Mar. 9, 2018, for Canadian Patent Application No. 2,961,952, dated Feb. 1, 2018, 21 pages.
Response to First Examination Report filed on Dec. 8, 2017 for Australian Patent Application No. 2015324030, dated Oct. 30, 2017, 15 pages.
Response to Office Action filed on Dec. 21, 2018, for Korean Patent Application No. 10-2017-7011806, dated Oct. 25, 2018, 41 pages.
Shokouhi et al. , "Time-Sensitive Query Auto-Completion", Proceedings of the 35th international ACM SIGIR conference on Research and development in information retrieval, Retrieved from <http://tx.technion.ac.il/.about.kirar/files/Radinsky-AC.pdf>, Aug. 2012, 10 pages.
Notice of Allowance received for Korean Patent Application No. 10-2020-7029217, dated Jul. 13, 2021,3 Pages(2 Pages of Official Copy & 1 page of English Translation).

* cited by examiner

METHOD OF IDENTIFYING TEMPORAL DEMAND OF QUERIES AND METADATA TO GIVE BETTER AUTOCOMPLETE QUERIES AND IMPROVED SEARCH RESULTS

RELATED APPLICATION

This application is a continuation of U.S. application Ser. No. 14/869,541, filed Sep. 29, 2015, which claims the benefit of priority of U.S. Provisional Application No. 62/057,548, filed Sep. 30, 2014, which is hereby incorporated by reference in its entirety.

FIELD

The present disclosure relates generally to autocomplete functionality within a search engine, and to the use of periodic time-based changes in expected searches received by a system to improve autocomplete performance.

BACKGROUND

Autocomplete is a function of a computing device that receives a portion of a user input and predicts the final user input. In certain systems, a single predicted input is provided, while in other systems, a list of possible final inputs are presented and a user may then elect a predicted input rather than completing the input started by the user. Embodiments described herein relate to improved systems and methods for autocomplete functionality and search results.

BRIEF DESCRIPTION OF DRAWINGS

Various ones of the appended drawings merely illustrate example embodiments of the present invention and cannot be considered as limiting its scope.

DETAILED DESCRIPTION

Figure 1:
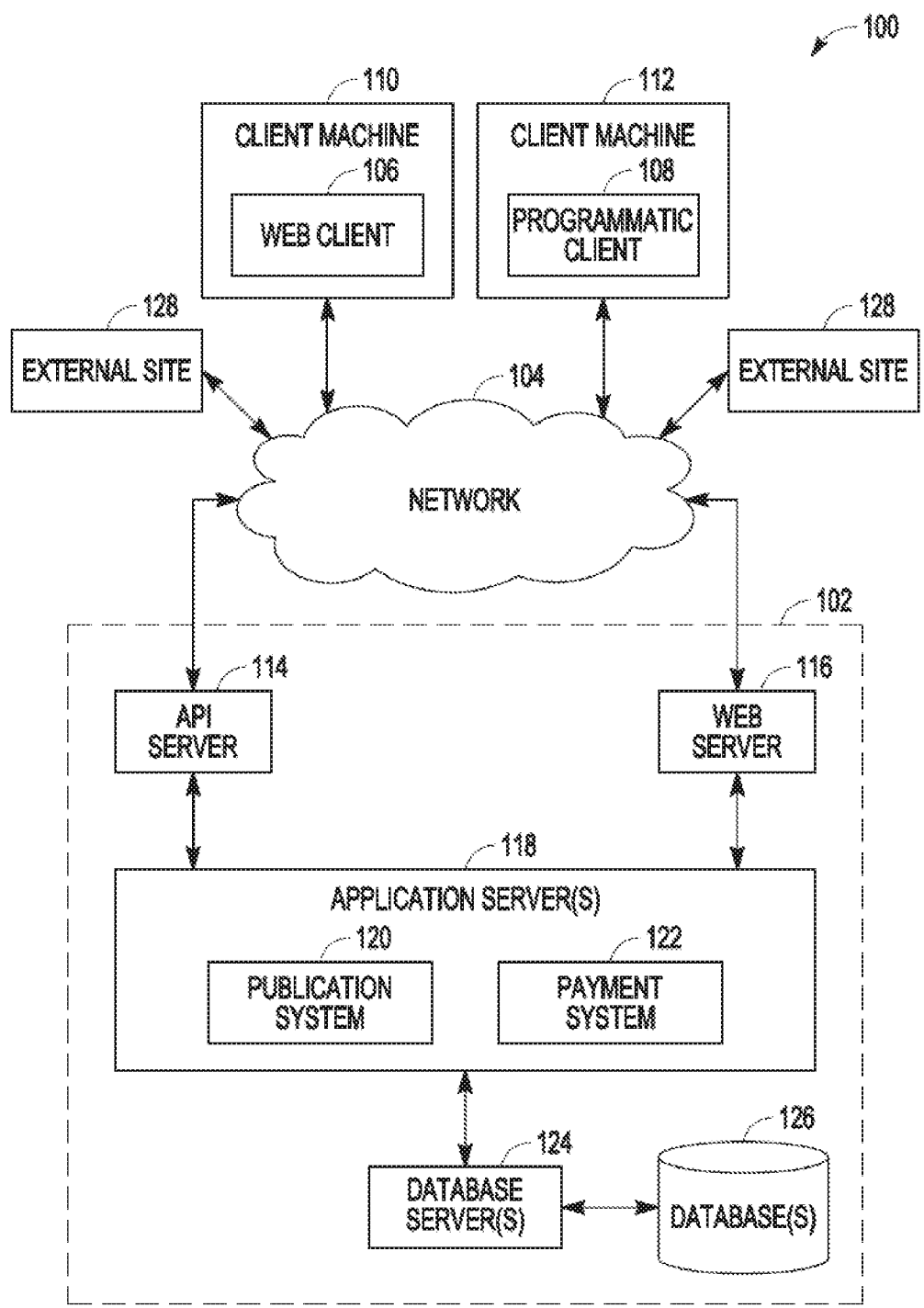
FIG. 1 is a block diagram of a network architecture which may use improved autocomplete and search result implementations according to some example embodiments.

The description that follows includes systems, methods, techniques, instruction sequences, and computing-machine program products that embody illustrative embodiments. In the following description, for purposes of explanation, numerous specific details are set forth in order to provide an understanding of various embodiments of the subject matter. It will be evident, however, to those skilled in the art that embodiments of the inventive subject matter may be practiced without these specific details. In general, well-known instruction instances, protocols, structures, and techniques have not been shown in detail.

Embodiments described herein relate in general to autocomplete systems and search results, and, in particular, to systems which identify time-based changes in user inputs to a system. For example, every four years during the soccer World Cup, user inputs received at a search engine that are associated with soccer may increase dramatically. Embodiments described herein may capture and use information about the temporal proximity of the soccer World Cup in conjunction with a partially typed user input to improve search results which are presented as autocomplete selections. For example, a standard search may take the partial user input "soc" and present a list of autocomplete options including "socks" "System on a Chip (SOC)" or "soccer." A system which uses information about a World Cup event that is in process may use this partial input of "soc" to provide a list of autocomplete options which are all associated with soccer or the World Cup. After the World Cup is over, search results will return to a normal weighting of World Cup search results, which will likely be significantly lower than the weighting during the World Cup.

Autocomplete as described herein is a feature provided by certain computing programs or services, such as web browsers, word processors, and search engine interfaces. Autocomplete involves a prediction of a word or phrase that a user is typing without the user typing it in completely, and may be based on an initial partial input of the word or phrase. Such autocomplete functionality may both reduce user input times and suggest inputs that may not have been considered by a user.

Many user queries begin with a partial input by the user before the user has decided on a final input phrase. In addition to this, user queries are often either broad or ambiguous. In certain autocomplete systems, a search engine may attempt to rank autocomplete results based on important features of a partial user input and then present the autocomplete results based on relevance. The more information the autocomplete system has, the better the system will perform in providing a result that is selected or preferred by a user. This includes both improved performance as the user inputs more of an input phrase, as well as other information that may be explicit or implicit. Explicit information may include autocomplete system preferences selected by a user, including user preferences or interests provided by the user. Implicit information includes inferred information that may be based not only on the particular user's previous searches, but on the previous searches of all system users.

As mentioned above, for systems that have access to historical information associated with a large number or all user searches input to the system, there may be periodic events where the input of particular phrases is received more frequently for a limited period of time, and these events may be correlated to particular times of year, days, or predictable events.

Certain search engines aggregate all of the most recent searches for days or a few weeks to predict future searches as part of an autocomplete system, but such systems based on recent history do not incorporate periodic events until the events are well underway or over due to the lag associated with the recent time aggregation.

Embodiments described herein may use both event beginning information, event ending information, and a repetition period to provide autocomplete results. In one embodiment, for example, a system may identify a set number of search categories, with each search category being associated with certain autocomplete phrases or subcategories. Rather than keeping a record of each actual search, the system keeps a record of what percentage of all searches are associated with a particular category. Periodic spikes in a percentage of all searches associated with a particular category may be associated with future dates, and autocomplete results during those future dates may be weighted toward phrases associated with the particular category or subcategories. For example, a "costume" category may see a popularity spike beginning every year three weeks before Halloween, and ending on the day of Halloween. Without responding to changes in real time or search results in the most recent time period, an autocomplete system according to embodiments described herein will use this information to automatically begin adjusting autocomplete results three weeks before Halloween, and will stop adjusting the results the day after Halloween. By contrast, a system using the most recent user inputs would begin adjusting results well after the popularity spike began, and would continue using biased results well after the spike was over. In the embodiments described herein using history to anticipate temporal data shifts, any periodic shift may be included. Such periodic adjustments could be annual, monthly, weekly, or even daily. Additional adjustments may be based by system operator identification of events which are not predictable, but which may be based on a calendar, an input schedule, or an automatic event trigger from scraped news data or other such inputs.

FIG. 1 is an example embodiment of high-level client-server-based network architecture 100 where partial user inputs may be received by networked system 102 from client device 110 or client device 112, and autocomplete search results may be provided based on the partial user inputs and an association with an autocomplete event time frame. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., the INTERNET EXPLORER® browser developed by Microsoft® Corporation of Redmond, Wash. State), and a programmatic client 108 executing on respective client devices 110 and 112. Either or both of web client 106 and programmatic client 108 may provide a user interface to both receive partial user inputs and to provide autocomplete search results to a user of the device.

The client devices 110 and 112 may comprise a mobile phone, desktop computer, laptop, tablet, phablet, wearable device, networked appliance, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, camera, microphone, and GPS device. The client devices 110 and 112 may be a device of a user, which is used to perform a transaction involving digital goods within the networked system 102. In one embodiment, the networked system 102 is a network-based marketplace that manages digital goods, publishes publications comprising item listings of products available on the network-based marketplace, and manages payments for these marketplace transactions.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. In certain embodiments, an autocomplete system may be integrated as part of a publication system 120, as part of a separate system operating on application server 118, or as part of a separate server system integrated with networked system 102. The application servers 118 are, in turn, coupled to one or more database servers 124 facilitating access to one or more information storage repositories or database(s) 126. In one embodiment, the databases 126 are storage devices that store information to be posted (e.g., publications or listings) to the publication system 120. The databases 126 may also store digital goods information in accordance with example embodiments.

In example embodiments, the publication system 120 publishes content on a network (e.g., Internet). As such, the publication system 120 provides a number of publication and marketplace functions and services to users that access the networked system 102. The publication system 120 is discussed in more detail in connection with FIG. 2. In example embodiments, the publication system 120 is discussed in terms of an online marketplace environment. However, it is noted that the publication system 120 may be associated with a non-marketplace environment such as an informational (e.g., search engine) or social-networking environment.

The payment system 122 provides a number of payment services and functions to users. The payment system 122 allows users to accumulate value (e.g., in a commercial currency, such as the U.S. dollar, or a proprietary currency, such as points, miles, or other forms of currency provide by a private entity) in their accounts, and then later to redeem the accumulated value for products (e.g., goods or services) that are made available via the publication system 120 or elsewhere on the network 104. The payment system 122 also facilitates payments from a payment mechanism (e.g., a bank account, PayPal™, or credit card) for purchases of items via any type and form of a network-based marketplace. In certain embodiments, multiple autocomplete systems may be integrated as part of a single networked system 102, for privacy and security reasons. For example, publication system 120 and payment system 122 may each be associated with separate autocomplete systems. Each of these separate autocomplete systems may use separate databases 126 which store data about periodic events which are associated with shifts in user search selections. In other embodiments, a shared database or system that tracks and updates search systems based on historical data regarding periodic or event-based shifts in user search preferences may be shared by multiple different autocomplete systems associated with different search applications.

While the publication system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
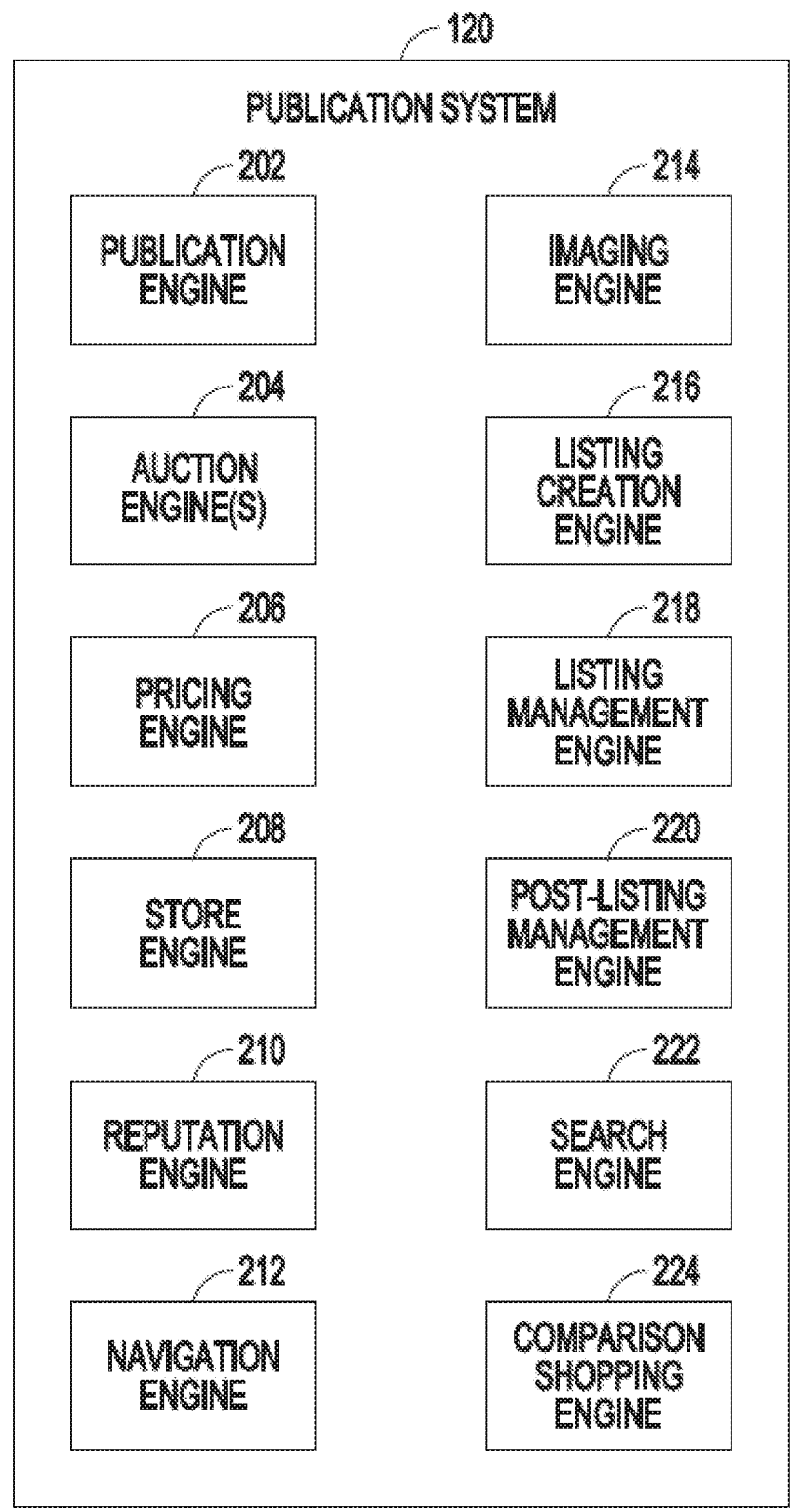
FIG. 2 is a block diagram of a publication system which may use improved autocomplete and search result implementations according to some example embodiments.

Referring now to FIG. 2, an example block diagram illustrating multiple components that, in one embodiment, are provided within the publication system 120 of the networked system 102 is shown. In this embodiment, the publication system 120 is a marketplace system where items (e.g., goods or services) may be offered for sale. The items may comprise digital goods (e.g., currency or license rights). The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 via the one or more database servers 124.

The publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.).

A pricing engine 206 supports various price listing formats. One such format is a fixed-price listing format (e.g., the traditional classified advertisement-type listing or a catalogue listing). Another format comprises a buyout-type listing. Buyout-type listings (e.g., the Buy-It-Now (BIN) technology developed by eBay Inc. of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the publication system 120 supports person-to-person trading between unknown entities, in accordance with one embodiment, users may otherwise have no history or other reference information whereby the trustworthiness and credibility of potential trading partners may be assessed. The reputation engine 210 allows a user, for example through feedback provided by one or more other transaction partners, to establish a reputation within the network-based marketplace over time. Other potential trading partners may then reference the reputation for purposes of assessing credibility and trustworthiness.

Navigation of the network-based marketplace may be facilitated by a navigation engine 212. For example, a browser module (not shown) of the navigation engine 212 allows users to browse various category, catalogue, or inventory data structures according to which listings may be classified within the publication system 120. Various other navigation applications within the navigation engine 212 may be provided to supplement the browsing applications. Any such applications may either include or access an autocomplete system described herein to provide autocomplete results to a user based on a partial user input and an autocomplete event time frame.

In order to make listings and autocomplete results available via the networked system 102 as visually informing and attractive as possible, the publication system 120 may include an imaging engine 214 that enables users to upload images for inclusion within publications and to incorporate images within viewed listings. The imaging engine 214 may also receive image data from a user as a search query and utilize the image data to identify an item depicted or described by the image data.

A listing creation engine 216 allows users (e.g., sellers) to conveniently author listings of items. In one embodiment, the listings pertain to goods or services that a user (e.g., a seller) wishes to transact via the publication system 120. In other embodiments, a user may create a listing that is an advertisement or other form of publication.

A listing management engine 218 allows the users to manage such listings. Specifically, where a particular user has authored or published a large number of listings, the management of such listings may present a challenge. The listing management engine 218 provides a number of features (e.g., auto-relisting, inventory level monitors, etc.) to assist the user in managing such listings.

A post-listing management engine 220 also assists users with a number of activities that typically occur post-listing. For example, upon completion of a transaction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210. Another post-listing action may involve the shipping of sold items whereby the post-listing management engine 220 may assist in printing shipping labels, estimating shipping costs, and suggesting shipping carriers.

A search engine 222 performs searches for publications in the networked system 102 that match a query. In example embodiments, the search engine 222 comprises a search module (not shown) that enables keyword searches of publications published via the publication system 120. In a further embodiment, the search engine 222 may take an image received by the imaging engine 214 as an input for conducting a search. The search engine 222 takes the query input and determines a plurality of matches from the networked system 102 (e.g., publications stored in the database 126). It is noted that the functions of the search engine 222 may be combined with the navigation engine 212.

A comparison shopping engine 224 manages transactions in the networked system 102. The operations of the comparison shopping engine 224 will be discussed in more detail below.

In certain embodiments, both explicit and implicit information from any of the above elements may be combined with a partial user input and an autocomplete event time period to determine autocomplete search results that are provided to a client device. For example, publication engine 202 and an associated auction engine 204 may provide records of listings or published information that matches search result variations based on temporal shifts in system user interest as described herein. Similarly, the listing creation engine may track information about author listings of items, including changes in author listings of items that are associated with periodic or predictably reoccurring events.

The information about predictably reoccurring events and shifts in user searches around these events may then be provided to a search engine 222 or comparison shopping engine 224. Results from search engine 222 or comparison shopping engine 224 are then updated and adjusting based on the identified changes that occur during the reoccurring event. In some embodiments, any module described above for publication system 120 may include forms with autocomplete services, or search services to supplement the basic operation of the module. Feedback based on reoccurring events to provide autocomplete results more may be used in any form element or search element of any of these modules of the publication system 120.

Although the various components of the publication system 120 have been defined in terms of a variety of individual modules and engines, a skilled artisan will recognize that many of the items can be combined or organized in other ways and that not all modules or engines need to be present or implemented in accordance with example embodiments. Furthermore, not all components of the marketplace system, which is an example of the publication system 120, have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3A:
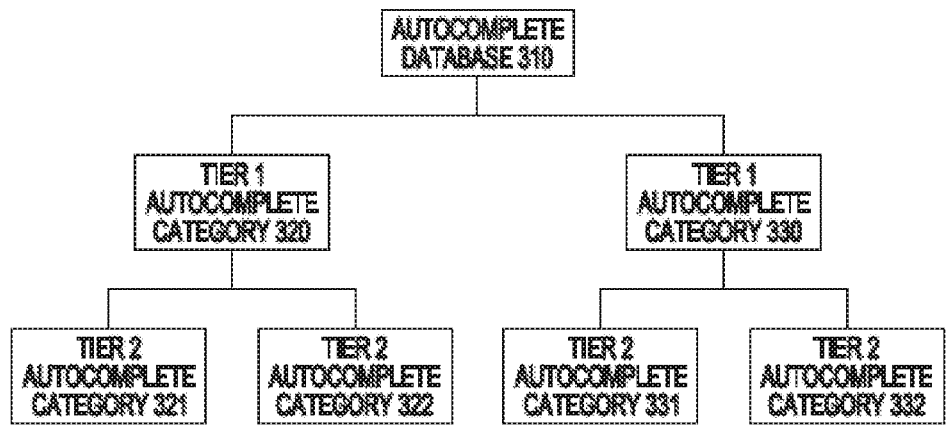
FIG. 3A is a diagram of a category tree database which may be used with improved autocomplete and search result implementations in accordance with some example embodiments.
Figure 3B:
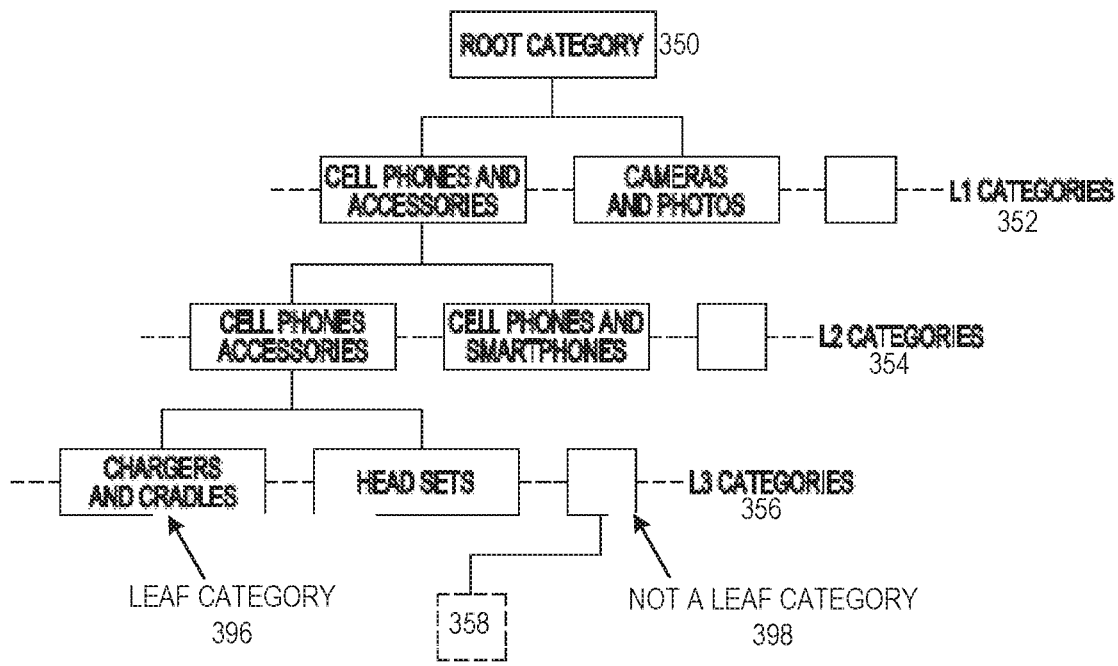
FIG. 3B is a diagram of a category tree database which may be used with improved autocomplete and search result implementations in accordance with some example embodiments.

FIGS. 3A and 3B illustrate aspects of a system for managing shifts in search preferences associated with reoccurring events. FIG. 3A illustrates a structure for a database that may be used for categories that can be associated with periodic events. FIG. 3B describes an example of a category tree using the structure shown by FIG. 3A according to an example embodiment. FIG. 3A shows a top tier autocomplete database 310 which uses categories organized into tiers. The example structure of autocomplete database 310 includes a first tier 1 autocomplete category 320 and a second tier 1 autocomplete category 330. Various embodiments of an autocomplete database may include any number of tier 1 categories, and may be dynamic such that tier 1 autocomplete categories may be added and removed over time. The structure of autocomplete database 310 is also shown including multiple tier 2 autocomplete categories 321, 322, 331, and 332. Each tier 2 autocomplete category is a sub-category of a tier 1 autocomplete category. Tier 1 autocomplete categories in such a system do not necessarily need to have any subcategories. Tier 2 autocomplete categories must be associated with a tier one category. A tier 1 autocomplete category is associated with any number of tier 2 autocomplete categories. Additional embodiments may include any numbers of tiers, with additional tiers associated with at least one autocomplete category of each higher tier.

FIG. 3B illustrates another example structure specifically illustrated with certain categories. The category tree data structure of FIG. 3B organizes categories that may be used by autocomplete or search systems. This example tree structure of FIG. 3B includes Cell Phones & Accessories (L1)>Cell Phone Accessories (L2)>Chargers & Cradles (L3 and also a Lowest level category). The root category 350 of category tree is parent of all L1 level categories, and may be considered a base structure of a database. Each category of L categories 352 are a logical grouping of the illustrated L2 categories 354 and may be called a parent of the corresponding L2 categories 354. L2 categories 354 may include a logical grouping of more than one L3 category 356 and will be a parent of any corresponding L3 categories 356.

A lowest level category at any point in the tree is referred to as a "leaf category." A leaf category is a category with no associated lower-tier categories. A leaf category may exist in any category tier. As described related to FIG. 3B a leaf category may be considered a lowest granular level category in a category tree under which items are listed. These categories could be at any level of category tree. This merely depends upon the depth or number of sub-branches for that path. Leaf category 396 is an example of such a lowest level category. Category 398 is not a leaf category due to category 358 being a lower level category that is a sub-branch of category 398. Such low level categories do not have any child categories under them in a tree diagram, but may include listed items. In some embodiments, parent categories do not include such item lists, and parent categories are simply considered to include the lists of each child category. A lowest level category may be associated with a variety of information. For example, in one embodiment, a lowest level category may have the associated category metadata:

Category Id: 123417
Level: L3
Is a lowest level category: Yes
Category Name: Chargers Cradles
Listings: Sellers have to list items which are of type Chargers or cradles under this category.
Link to category content In some embodiments, the example category tree of FIG. 3B may then be used to generate query category demand data. Queries, as referred to herein, are strings of data which are searched by a user. The strings of data can be related to any search information this is input to a search engine to trigger a search response. Query category demand data may comprise a model built using a history of queries (e.g. input strings of data) that have been received from system users as well as any associated selections made by a user. In other words, a model may be built by tracking user search query inputs and also tracking which element of a search result (if any) is subsequently selected by the user. In a model using the structure of FIGS. 3A and 3B, since items are listed under a lowest level category, all search data may be associated with a leaf category. In such embodiments, tracking the transition from Query to 'Items interacted with' to 'Listing Category (Lowest level Category) of item', a model is built: the model which maps Query to Lowest level Category based on a history of system user searches. Since categories have a hierarchical structure, new models can be built by transforming Query to Lowest level Category into Query to L2 Categories, and Query to L3 Categories. Such a model may then be used to enrich an autocomplete system where queries are tagged with their respective dominant category.

One example autocomplete dataset is built by mining past queries made by users and scoring them. A model generated by such a score may also be designed to capture metadata (for example, dominant category, attributes, etc.) associated with each query intended to give more value back to the user, and in order to provide more data for scoring.

Each query which is used by several users over the period of model building is assigned a score which is a weighted function of: frequency of that query; number of view items after using the query; number of items bought after using the query; number of items bid on after using the query; and number of items watched after using the query. In various other embodiments, other input information or various combinations of the above may be used. An autocomplete model then stores the query string, along with any scores or other metadata.

In addition to the list of function inputs above, a set of dominant categories for a particular set of query data may be identified using query category demand data, brand data (if the query includes brand data), and any additional attribute (if included in a query). When a user inputs a part of a query (whether a complete or partial token) a call is made to the autocomplete web service, which has logic to find matching queries from the autocomplete data store having the complete prefix (or part of the prefix). The possible results are ranked based on the query score of each matched query.

Embodiments described herein leverage the temporal nature of metadata of users' searches to improve the precision of autocomplete suggestions and search results. This may be done using the category structure described above to adjust autocomplete results on a category basis. Many groups of queries share a common prefix (e.g., an initial set of characters in an incomplete search input string). Given a prefix, the probability of each possible query sharing the prefix being the intended query changes over time. For example, when a user types "dress" as a prefix, if it is summer month, then "dress for summer" or "dress for beach" are more probable that "dress for cold" or "dress for winter." In a winter month, "dress for winter" has a higher probability than "dress for summer." The temporal nature of these searches is learned from users' past search history stored in a record of received user inputs. A temporal model built from these past search histories may provide autocomplete and other search queries with temporal score adjustments. Results with higher probability of occurrence for a given time are thus boosted during that time to rank them higher and present the results to a user in a more prominent location. A score for selecting a category in response to receipt of a partial user input and the autocomplete results provided to a user may thus be based on a score generated by matching characters on a partial user input with character strings associated with categories, where the score is weighted based on the temporal model.

There are several granularities of metadata values at which this temporal nature can be computed and modelled and then used to boost queries that hit their peak during that time of year. Time, too, can be at several granularity levels such as a week of the year, day of the year, hour of a day, or any other such temporal granularity.

In order to capture sufficient information at the level of each time segment for a particular granularity level, there are a number of challenges. If temporal demand is captured per query or at very low granularity level, then some query metadata may be sparse. This means there might not be enough data for all queries. For example, if temporal demand is computed at the query level itself, users' search history per query level will not have too many records. This will generate volatility in the model behaviour, and thus it is difficult to measure a temporal trend with a granularity level that is too low. Additionally, it is also computationally intensive to compute temporal time series data at each query level. Moreover this methodology can only boost queries which were observed in past but not new queries that are never seen. Embodiments may thus compensate the granularity levels in a model based on the amount of data that is available. When a new query is seen, no adjustment may be made, but as more and more data is gathered over time, the granularity levels may automatically be adjusted based on the amount of data available. This provides the benefit of the tracking adjustments for reoccurring events described herein while avoiding volatility.

Embodiments described herein use temporal demand at metadata level to build the temporal model. Temporal demand can be extrapolated or computed at any granularity level whether at the category level or any attribute (like brand, model, etc.) level as long as sufficient information is received to support a particular granularity level.

Further, computing temporal data at a metadata level, for example at the category level, may also provide benefits. In certain embodiments, each query has some associated category which is described well by the model that is in use. Categories may be a well-defined structure which groups items of similar theme together and thus category data can capture the temporal nature surrounding a theme or a reoccurring event very well. For example, L2 categories or golf or fishing may be captured under a 'sporting goods' L1 category. Trends in the L1 category may capture shared trends for the lower level categories as a sport theme. For example, given a particular week of the year, a system computes how many unique users have searched a query which belongs to that category in the week. To avoid false positives of peak due to organic growth of traffic to the site, this data may be transformed into probabilities per week. In such an embodiment, for a given week, a probability of a category being searched equals a number of unique users searching queries in a given categories divided by a total number of unique users conducting a search in the system in any category.

There could be different ways to identify if there is a surge in search (temporal demand) for a given category in the particular week. One such identification may be threshold based: if there is a change in the probability of search for a given category beyond a certain threshold, and this trend can be observed year over year, that category can be marked as a candidate category for that time point. Another such identification may be based on a change of moving average (e.g., three week moving average, daily average, etc.) of probabilities for a given category. If the current time probability is more than the moving average by a certain percentage, the category can be marked as a candidate category for that time point. Such identification may be based on an identified temporal deviation from normal followed by a return to normal that may be characterized as having an identifiable impact on scoring. Thus for each category, the time (e.g., week number or day number of the year) is marked where the demand surged and this surge is observed in multiple time periods. The generated temporal model may then be stored in some data store.

After such a temporal model is created around a set of metadata, including a category association, the model may be used to adjust autocomplete results or search results. In a system using the autocomplete model, when a user types a prefix (e.g., a partially complete query or token) and it is passed to the autocomplete service, the service determines what time of the year it is or where in the considered time period the user input is occurring. From the data store which stores the temporal model (representing temporal demand of the metadata), the service pulls the metadata for which there was a demand surge for the given time (e.g., list of categories with higher demand for the week number when the query is executed). During a query phase, resulting metadata information may be used and all the query documents scores may be adjusted based on input from the temporal model.

The adjustment may be done in several ways. In one potential embodiment, a system may use an Apache™ search platform. A standard search request may be placed by the system in response to receipt of a user query. If a system is using a temporal model, the query may be input into the model, and if a current event is identified by the temporal model, the standard search request may be modified by a boost query that is added to influence the score based on the information from the temporal model. Such a boost may function as a raw query string that will be included to influence the score for results associated with boosted categories. In certain embodiments, a single user query may be influenced by multiple boosts. This may occur, for example, if two overlapping temporal events are associated with a current time period and both are associated with the user's partial input or search request.

For example, autocomplete search result A in a first category may have a standard string matching score of X. and search result B in a second category may have a standard string matching score of Y. A boost associated with a temporal model identifying a repeated event happening during a current considered time period may boost each result score for the second category by 150%, so that the score used to rank result A against result B will by X compares with 1.5 times Y. The autocomplete search results will then be sent to a user based on the modified set of scores.

Figure 4A:
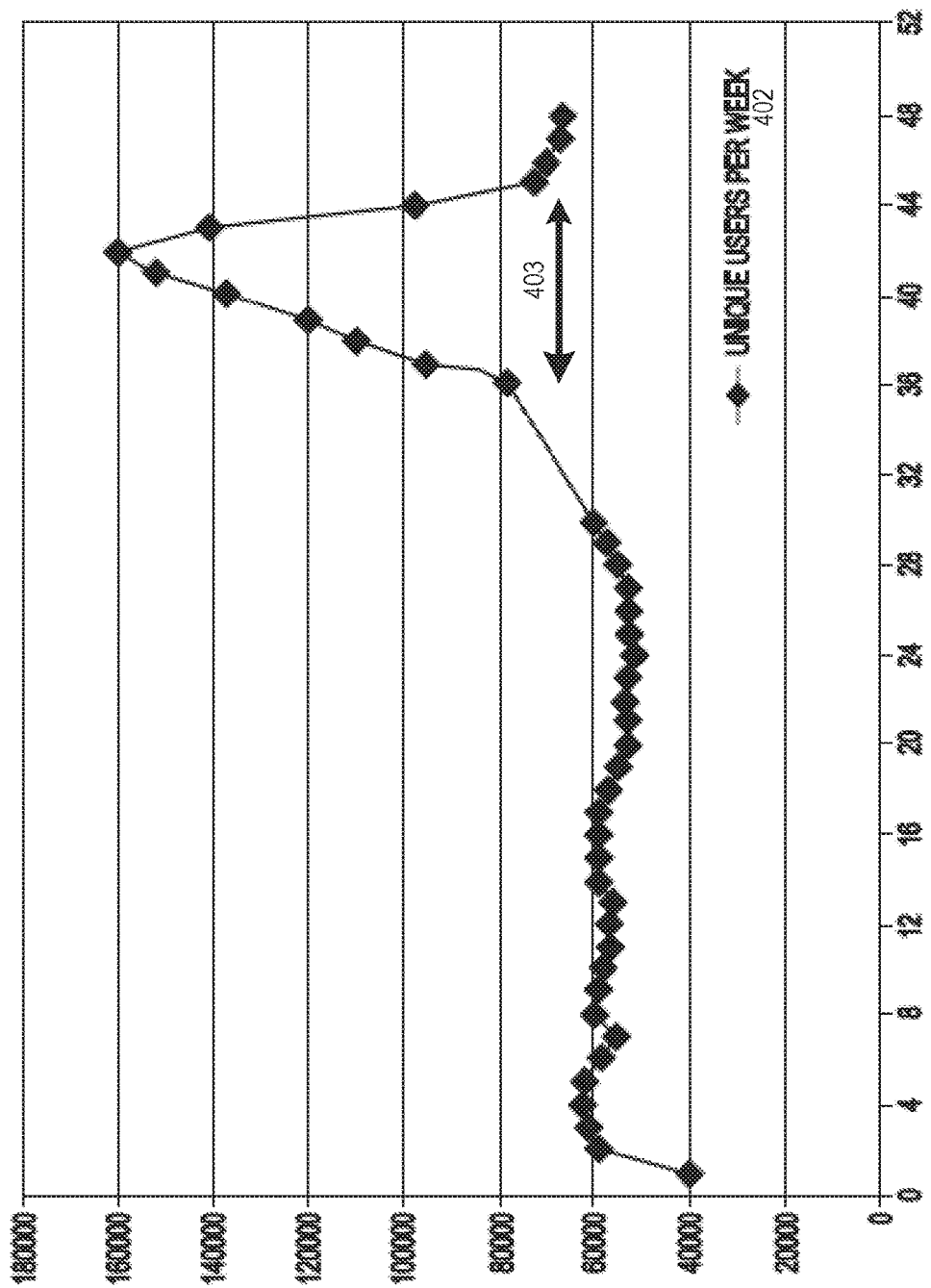
FIG. 4A is a diagram illustrating time-based changes in search requests associated with particular terms according to some example embodiments.
Figure 4B:
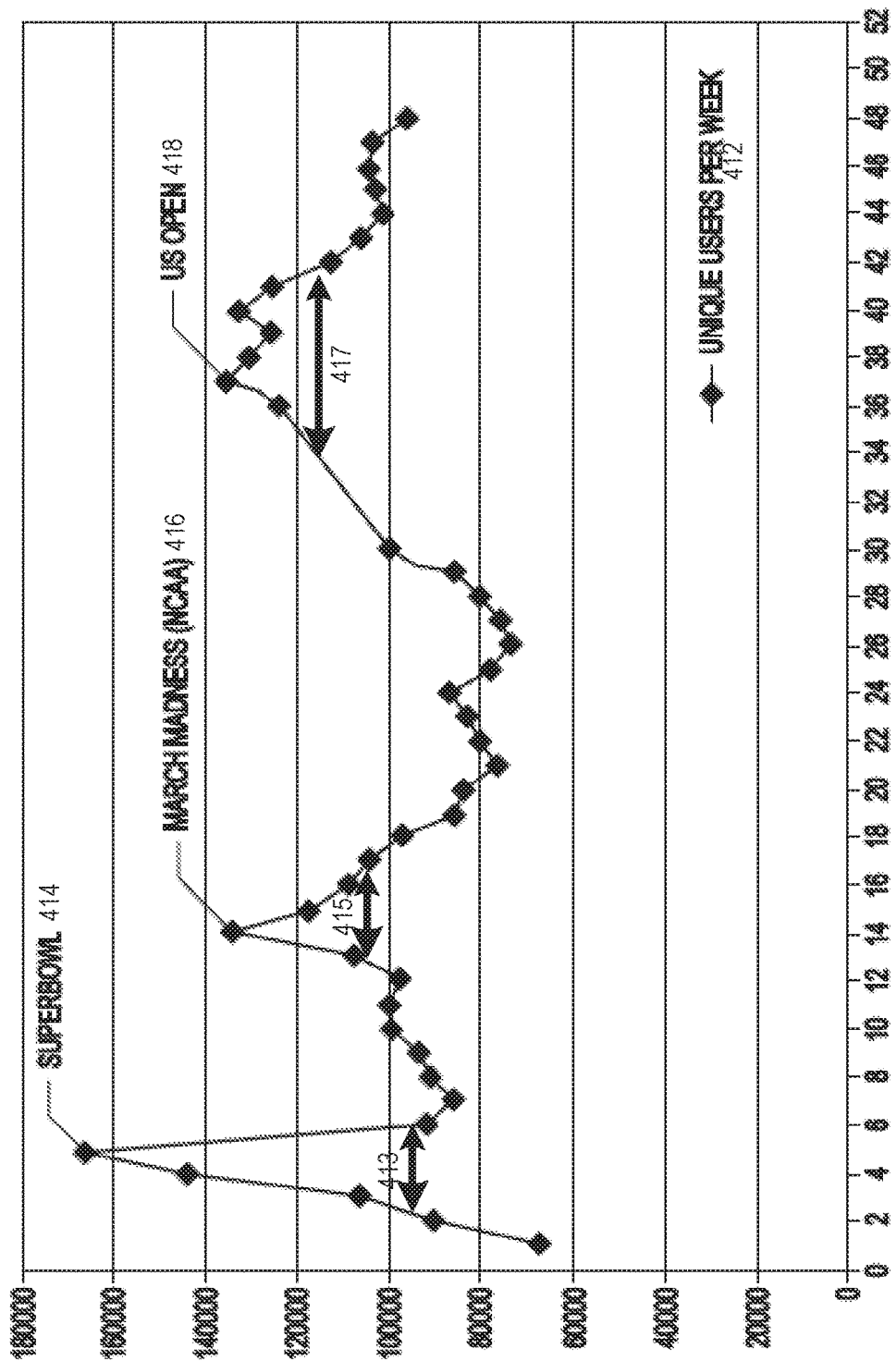
FIG. 4B is a diagram illustrating time-based changes in search requests associated with particular terms according to some example embodiments.

FIGS. 4A and 4B then provide examples of records of received user inputs associated with a particular category over a selected time period, with the records aggregated into a model. In the example of FIGS. 4A and 4B, the time period is one year, with time-based information for an annual number of searches associated with a particular category. FIG. 4A may, for example, be associated with a category labelled "costumes reenactment/theater" and FIG. 4B is associated with a category labelled "sports tickets." FIG. 4A shows example data of a unique number of users per week 402 for the "costumes re-enactment/theatre" category and FIG. 4B illustrates example data of a unique number of users per week 412 for the "sports tickets" category. In the embodiment illustrated by FIG. 3, these categories may be tier 2 categories under separate tier 1 categories.

In various embodiments, the information for such charts may be gathered over a single year or over multiple years and over many categories, and may be presented on any periodic basis. FIGS. 4A and 4B both show unique users per week 402, 412 associated with searches for the respective categories. FIG. 4A shows a large spike associated with a number of searches for the "costumes re-enactment/theater" category in a particular set of weeks. This information is used in building temporal model and stored in an autocomplete database 310 as part of an autocomplete system. This information may be used to identify an autocomplete event time frame associated with this spike. In various embodiments, this may be identified as a single event, or may be identified as multiple events to distinguish the magnitude of the event at different time periods. Additionally, other information may be used to associate this spike with a particular event, such as associating the event of FIG. 4A with the Halloween holiday. The model may identify the spike in unique visitors per week 402 as a boosted time segment 403 having a starting point and an ending point identified by an analysis and modelling of unique users per week 402 over one or more periods of a repeated considered time period.

Similarly, FIG. 4B identifies multiple events in the presented unique users per week, with the events labelled on the graph as Super Bowl 414, March Madness 416, and US Open 418. Each of these events may be associated with a lowest level leaf category within a higher level "sports tickets" category which is represented by the data for unique users per week 412. These events as identified in the autocomplete history data of FIG. 4B may be used to identify autocomplete event time frames 413, 415, and 417 for the future Super Bowl 414, March Madness 416, and US Open 417 events, and to adjust autocomplete search results during those respective repeated considered event time frames 413, 415, and 417. Thus, as shown, a repeated considered time frame used by a model to boost results scores for a particular leaf category may be based on a trigger event, rather than a specific time period within an overall time period considered. Boosted time segments 413, 415, and 417 may thus be based on an event date that may vary over multiple periods of time considered as associated with the corresponding trigger for Super Bowl 414, March Madness 416, and US Open 418 rather than based on a consistent start and end data.

Further, multiple event time frames may overlap, such that any number of autocomplete event time periods may occur at the same time, with each autocomplete event time period influencing autocomplete search results. Thus, in a system that uses scoring, a single category or multiple categories may have their scores adjusted with modifiers to add or multiply base scores based on analysis within a model. Similarly, boost scores may be set based on the data. For example, a boost associated with Super Bowl 414 during considered event time period 413 may be larger than boosts for considered event time periods 415 and 417 based on the larger deviation from standard during period 413.

FIGS. 5A-D then illustrate four examples of autocomplete partial user inputs with different autocomplete search results at different time periods due to an adjustment based on a temporal model. For each example, one set of autocomplete search results based at least in part on an identified autocomplete event time period from a temporal model is used, and a second set of autocomplete search results which does not use the identified autocomplete event time period is presented.

Figure 5A:
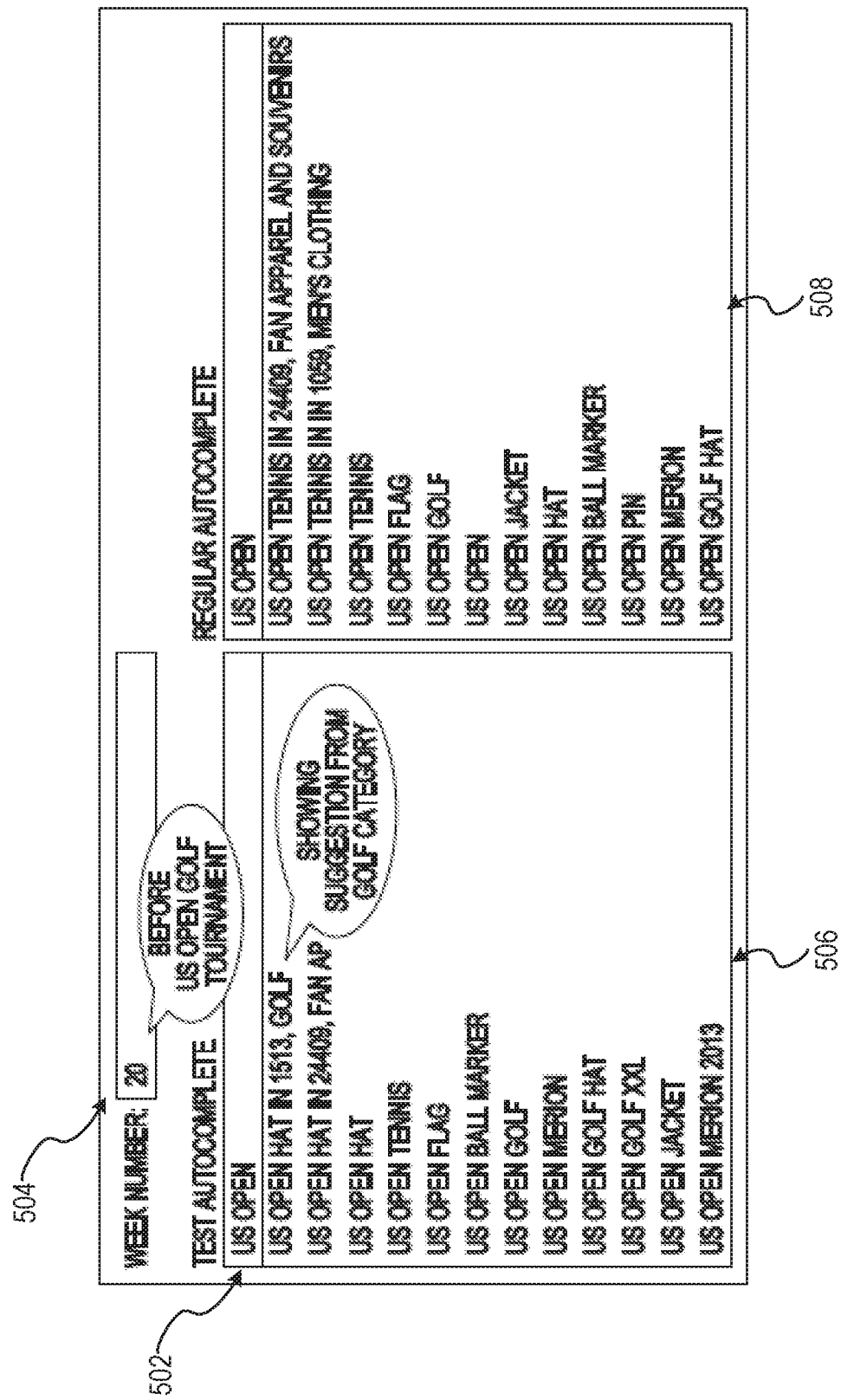
FIG. 5A illustrates aspects of a user interface according to some example embodiments.

FIG. 5A shows partial user input 502 and an autocomplete event time period 504 that is associated with a repeated event identified from a record of received user inputs and other metadata. A first set of autocomplete results 506 shows results as modified by the temporal model if the partial user input 502 is received during an autocomplete event time period that is within the autocomplete event time period 504.

In some embodiments, an autocomplete event time period may also be referred to as a boosted time period. A second set of autocomplete results 508 illustrates baseline results without an adjustment from the temporal model. As described above, the text strings in the first set of autocomplete results 506 may be selected by modifying scores for each possible string considered with a boost value for strings that are associated with a category associated with the autocomplete event time period 504. In other embodiments, other modifications based on the partial user input being received during the autocomplete event time period may be used.

Figure 5B:
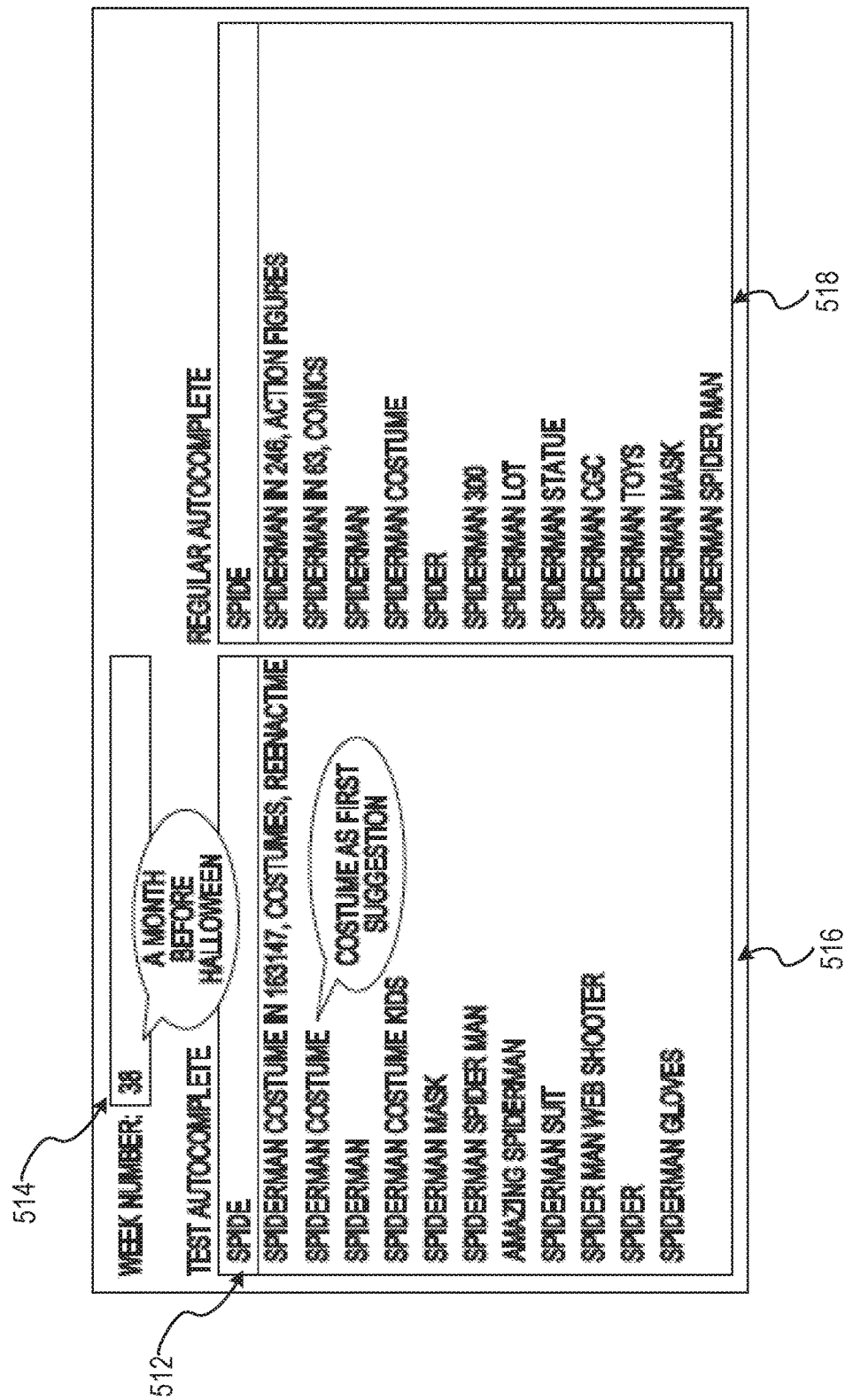
FIG. 5B illustrates aspects of a user interface according to some example embodiments.
Figure 5C:
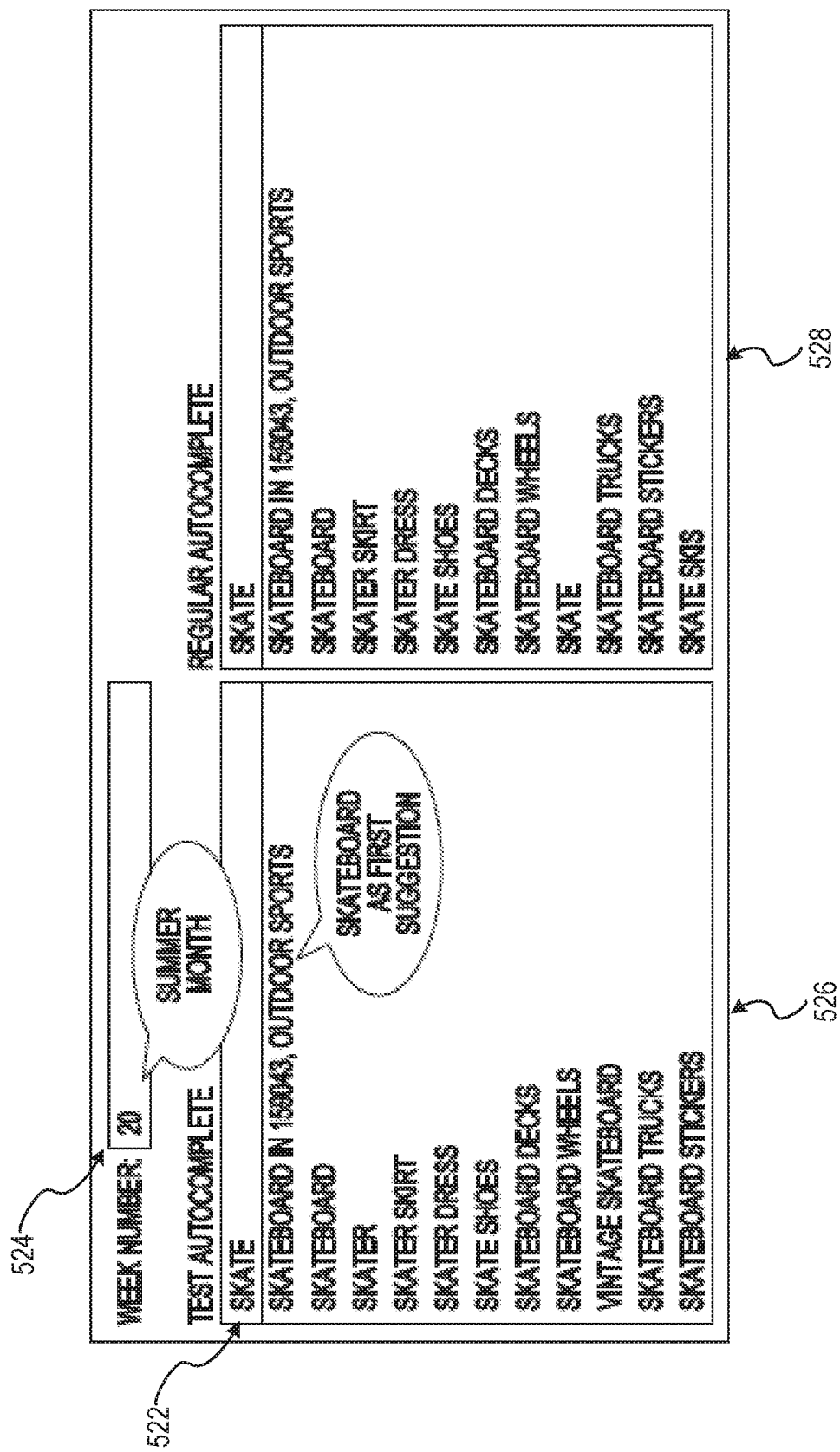
FIG. 5C illustrates aspects of a user interface according to some example embodiments.
Figure 5D:
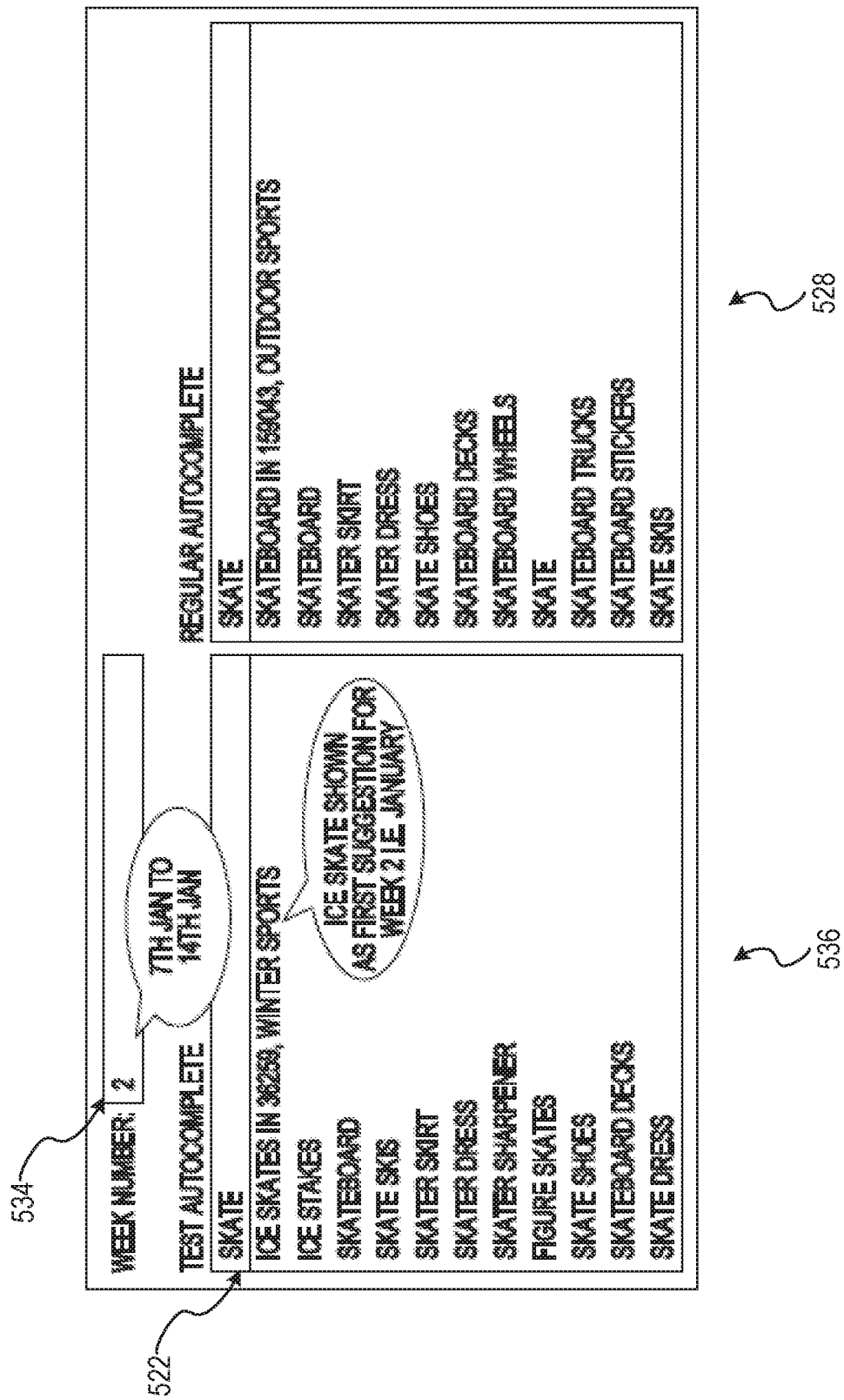
FIG. 5D illustrates aspects of a user interface according to some example embodiments.

FIGS. 5B, 5C, and 5D then show similar comparisons of autocomplete results based on partial user inputs. FIG. 5B shows partial user input 512, autocomplete event time period 514, first set of autocomplete results 516 that are adjusted based on the temporal model, and a second set of autocomplete results 518 that are not modified by the temporal model.

FIGS. 5C and 5D then show an example using the same partial user input 522, but during a different autocomplete event time period. Autocomplete event time period 524 is associated with week 20 of a calendar year, which is a summer period. A first set of autocomplete results 526 is slightly different than a second set of autocomplete results 528 based on the temporal model. In FIG. 5D, however, the autocomplete event time period is week 2 of a calendar year, which is a winter period. The temporal model identifies "winter sports" as a category that is boosted during this autocomplete time period 534 based on a record of received user inputs. Data strings from previously received searches associated with this category and matching the partial user input 522 are thus boosted to the top of the first set of autocomplete results 536. The second set of autocomplete results 528 in FIG. 5D, however, is the same as in FIG. 5C, where the same partial user input 522 is considered using an autocomplete ranking not adjusted by the temporal model.

Thus, as described herein, any search system including an autocomplete or other search ranking system may use history data stored by the system as a record of received user inputs to identify periodic events or patterns for categories of data, particular strings of data, or queries associated with certain metadata as illustrated by FIGS. 4A and 4B. This record of received user inputs is then used to generate a temporal model capturing a historical demand for certain search categories. When a partial user input is received, a set of autocomplete search results provided to a user may be adjusted based on the temporal model as illustrated by FIGS. 5A-D.

In one implementation, an identified autocomplete event time period may be used to influence autocomplete search results as follows. An autocomplete database may include a list of all previously seen user inputs. These user inputs may include user keyboard entries, user selection of an autocomplete search result, or any other such search input. Each previously seen user input may be associated with a system time period or considered time period. This may be a week of the year, as illustrated in FIGS. 4A and 4B or may be a particular day, hour, or minute within the considered time period. In certain embodiments, a system may be based on multiple considered time periods. For example, a system may include separate adjustments for daily variations in user inputs as well as weekly and annual variations in user inputs. Each considered time period may be divided into a plurality of time segments. As each user input is received, it is associated with a particular time segment of the considered time period. Each user input is also associated with one or more categories of user inputs. An autocomplete database is thus created from the user inputs, with metadata associating each user input with a time segment of a considered time period and one or more categories. The autocomplete database may then be analysed to determine patterns in the user inputs. In one embodiment, each category is analysed during each time segment to determine the percentage of all user inputs associated with that category during the time segment. This is done for each time segment of the considered time period. Deviations in an expected percentage associated with each category for a set of time segments may be identified as autocomplete event time periods. Such deviations may be a set number of standard deviations from an average over the considered time period. Such deviations may be any other such quantifiable change in the percentage over the considered time period. The deviations are then used to implicitly infer that future time segments for future repetitions of the considered time period will contain similar deviations. For example, it may be inferred that future weeks prior to Halloween will see increased user inputs associated with costumes, and that this will occur every year.

When a user begins keying a user input into an interface at a client device, each keystroke may be sent to a networked system including an autocomplete system as a partial user input. As the autocomplete system receives each keystroke and adjusts the partial user input, it may search against keystroke patterns contained in certain categories. For time segments of a considered period not associated with an autocomplete event time period, a first set of autocomplete criteria may be used which does not use the periodic data from the above described system. Instead, these autocomplete criteria may be based on an average or standard autocomplete matching, which weighs possible matches from autocomplete categories based on their average user input percentage over the entire considered time period. In other embodiments, any such autocomplete search methodology may be used. When keystrokes are received within an autocomplete event time period, weighting factors may be added to categories associated with the autocomplete event time period which make words or phrases from these categories more likely to be selected as autocomplete search results, and may further prioritize such words or phrases by, for example, placing them in a preferred position within a set of autocomplete search results.

As additional keystrokes are received, the search results may be updated with each keystroke. When a user selects a final user input by completing the keystroke entry or by selecting a presented autocomplete search result entry, the autocomplete system may receive this information as a user input. The user input may then be placed in the autocomplete database with the time-based metadata and category metadata. The analysis of the autocomplete database used to identify autocomplete event time periods may then be updated using this feedback information. This update may be performed as each user input is received, may be performed periodically, or may be performed based on a trigger or operator input.

Thus, in certain embodiments, there are events which occur periodically. Examples of such events include annual events such as annual holidays or annual sporting events. Additionally, seasonal events such as a winter sports season, a summer sports season, or a scheduled sports season are such periodic events. Search data may be mined to build time series data around user search queries and surrounding metadata like a dominant category of the query. This process of analysis may be repeated for one or more considered time periods to identify and filter possible outlier or non-temporal peaks. For example, new product launches that are not periodic may create outlier deviations in a single considered time period that may be filtered by obtaining data from multiple considered time periods.

The time series data repeating over the considered time period may be processed to identify the point in time when deviations or spikes in the number of queries for a given time period are seen. In various embodiments, an analysis may be done to identify variations in certain queries or dominant categories or any other query metadata. This information may be used for a model that captures the period variation in the number of queries associated with a category. The model may be built capturing this information as one or more autocomplete event time periods. A system may then include a number of models, with each model covering a particular time period based on the historical record of observed searches or autocomplete selections received from system users.

During future segments of a considered time period associated with an autocomplete event time period, queries belonging to that metadata or category may be boosted in autocomplete search results. In other words, queries belonging to categories which have seen surges or changes during the same segments of previous considered periods may be adjusted, thus tailoring search results towards temporal events. This may additionally have the result of boosting search items from the temporal categories or metadata during ranking.

Thus, in addition to autocomplete results being adjusted by the autocomplete event time period, after the final user input is received, the search results provided to a client device in response to the final user input may also be adjusted. For example, in a category-based search, the same process used to adjust autocomplete search results described above may also be used to adjust search results and search result ranking in response to a user input. In certain embodiments, the same analysis, database, and temporal adjustment system may be used for both autocomplete search results and search results that are in response to a completed user input. In other embodiments, these may be separate systems with separate criteria.

Figure 6:
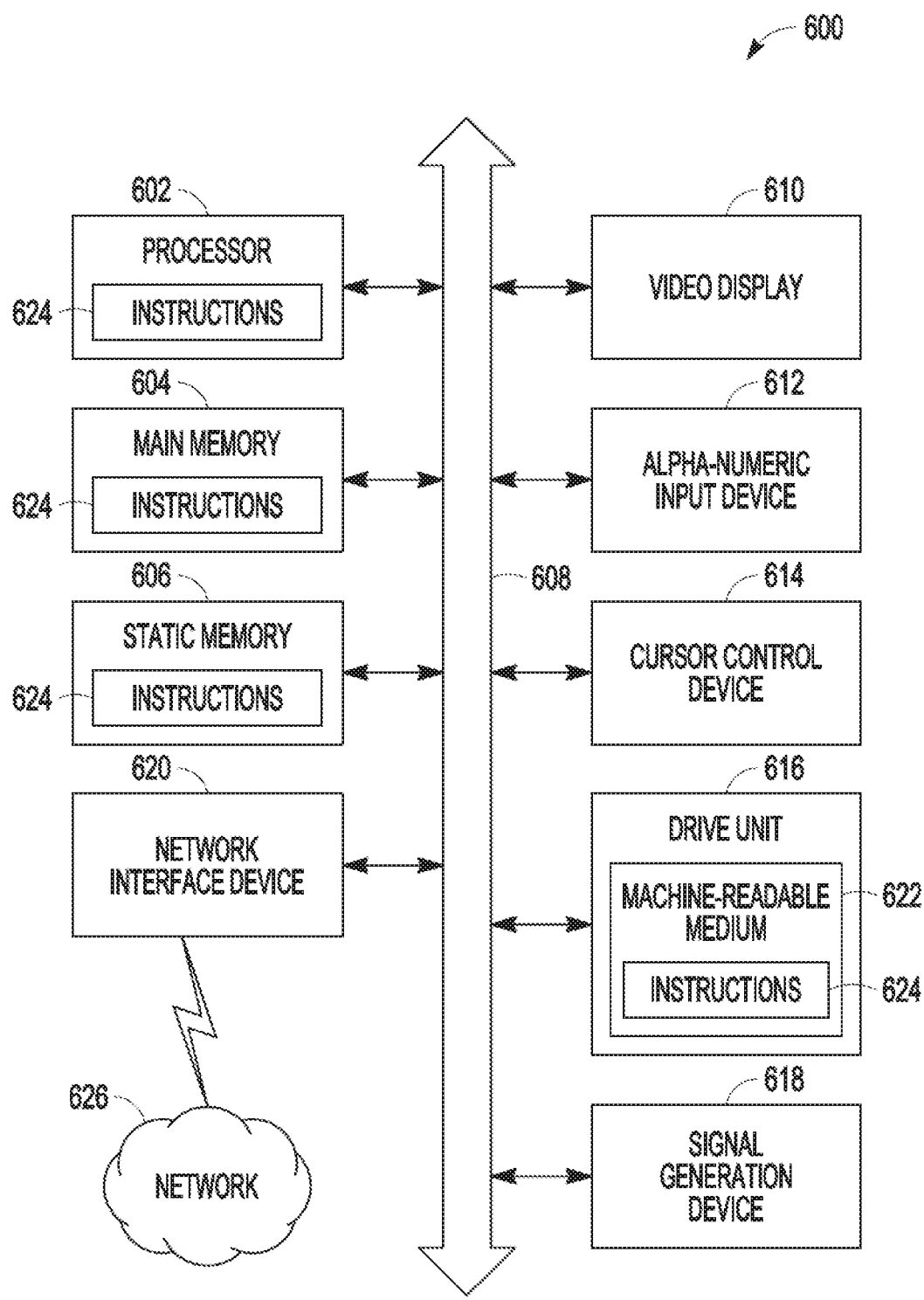
FIG. 6 is a simplified block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. In various embodiments, aspects of an application server 118, publication system 120, client devices 110 and 112, database servers 124, or any other such device as part of any embodiment described herein may be implemented as a machine 600. In other embodiments, such devices may be implemented using other elements and devices different from the machine 600 of FIG. 6. FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a video display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a drive unit 616, a signal generation device 618 (e.g., a speaker), and a network interface device 620.

The drive unit 616 includes a machine-readable medium 622 on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi, LTE, and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., at least one processor or a group of processors) may be configured by software (e.g., an application or application portion) as a hardware module that operates to perform certain operations as described herein.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 7:
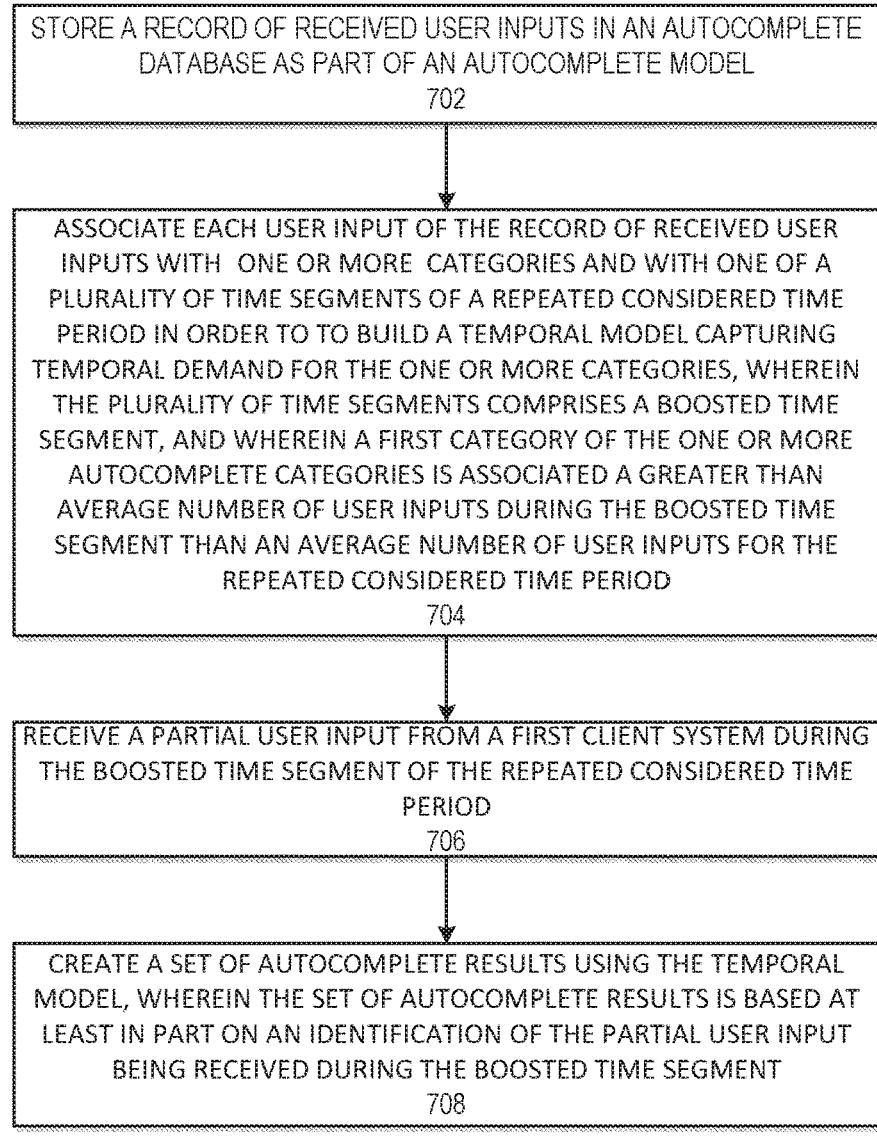
FIG. 7 describes a method for using temporal query data for generating autocomplete results and search results.

FIG. 7 illustrates an example method 700 that may be used according to some example embodiments. Method 700 may be performed by a device 600, a networked system 102, or any other such device described herein. Method 700 begins with operation 702 performed to store a record of received user inputs in an autocomplete database as part of an autocomplete model. The record of received user inputs may include a record of partial user inputs and complete user inputs along with a search selection. In other embodiments, the record of received user inputs may not include a specific record of each user input, but may simply include a temporal model generated from the user inputs. Such a model may include trend or boost percentage data associated with categories, metadata, or other aspects of an autocomplete search. In other embodiments, other model structures may be used.

To generate the temporal model, in operation 704 each user input of the record of received user inputs is associated with one or more categories and a boosted time segment of a repeated considered time period to build a temporal model capturing temporal demand for the one or more categories during the boosted time period. In operation 704, the temporal model is then built by operations to associate each user input of the record of received user inputs with one or more categories and with one of a plurality of time segments of a repeated considered time period in order to build a temporal model capturing temporal demand for the one or more categories, wherein the plurality of time segments comprises a boosted time segment, and wherein a first category of the one or more autocomplete categories is associated with a greater than average number of user inputs during the boosted time segment than an average number of user inputs for the repeated considered time period. The boosted segment may identify this deviation from average in a number of ways, other than a direct calculation of statistical average. This may be done by measuring threshold values for the number of inputs, or in any other form that identifies the deviation present in the boosted time segment.

The temporal model is then used in operation 706 when a device is set to receive a partial user input from a first client system during the boosted time segment. In operation 708, a set of autocomplete results is created based at least in part on an identification of the boosted time period associated with the partial user input using the temporal model.

Additional embodiments of method 700 may then further operate in a variety of ways. For example, one embodiment may function where the considered time period is one year and where each time segment of the plurality of time segments is one week. Such an embodiment may further operate where the boosted time segment is identified by: for each category of the one or more categories, identifying a percentage of all user inputs associated with that category for each time segments of the repeated considered time period; identifying one or more time segments of the plurality of time segments where the probability of all user inputs associated with a first category deviates from an expected value by more than a threshold amount; and selecting the one or more time segments where the probability of all user inputs associated with the first autocomplete category deviates from the expected value by more than the threshold amount as the boosted time segment.

Further such embodiments may operate where the boosted time segment is further associated with a triggering event. Further such embodiments may operate where the triggering event is a holiday date, wherein the boosted time segment comprises an annual period from a fixed number of weeks prior to the holiday date through the week of the holiday date. Further such embodiments may operate where the boosted time segment is associated with an annual start data and an annual end date. Further such embodiments may operate where the boosted time segment is identified by a weekly start day and time and a weekly end day and time. Further such embodiments may operate where each category of the one or more categories is identified, at least in part, by metadata received with each user input of the record of received user inputs. Further such embodiments may operate where each category of the one or more categories is a lowest level leaf category within a category tree structured with multiple tiers of categories; where each lowest level leaf category within the category tree is associated with one or more search strings within a database; and where associating each user input of the record of received user inputs with the one or more categories comprises accessing the database and comparing each user input with the one or more search strings of each lowest level leaf category to generate the association between the one or more categories and each user input.

Further such embodiments may operate where the one or more processors are further configured to associate the one or more categories and the partial user input using a first set of match scores ranking an expected relationship between the partial user input and the one or more autocomplete categories, wherein the first set of match scores is weighted based on the determination that the first category of the one or more autocomplete categories receives the greater than average number of user inputs during the boosted time segment than the average number of user inputs for the considered time period. The match scores may thus be based on a change from the average during a boost period of a considered time period, as illustrated by FIGS. 4A and 4B.

Further such embodiments may operate where each user input of the record of received user inputs is associated with the one or more categories based on a match scoring, the match scoring comparing characters of a query string for each user input and metadata associated with each user input with metadata for each lowest level leaf category and the one or more search strings of each lowest level leaf category to generate a set of match scoring results for each user input of the record of received user inputs.

Machine and Software Architecture

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device while yet another combination produces a server computer for use within a cloud computing architecture. Not all combinations of such software and hardware architectures are presented here as those of skill in the art can readily understand how to implement the concepts contained in the present disclosure in different contexts from the disclosure contained herein.

Figure 8:
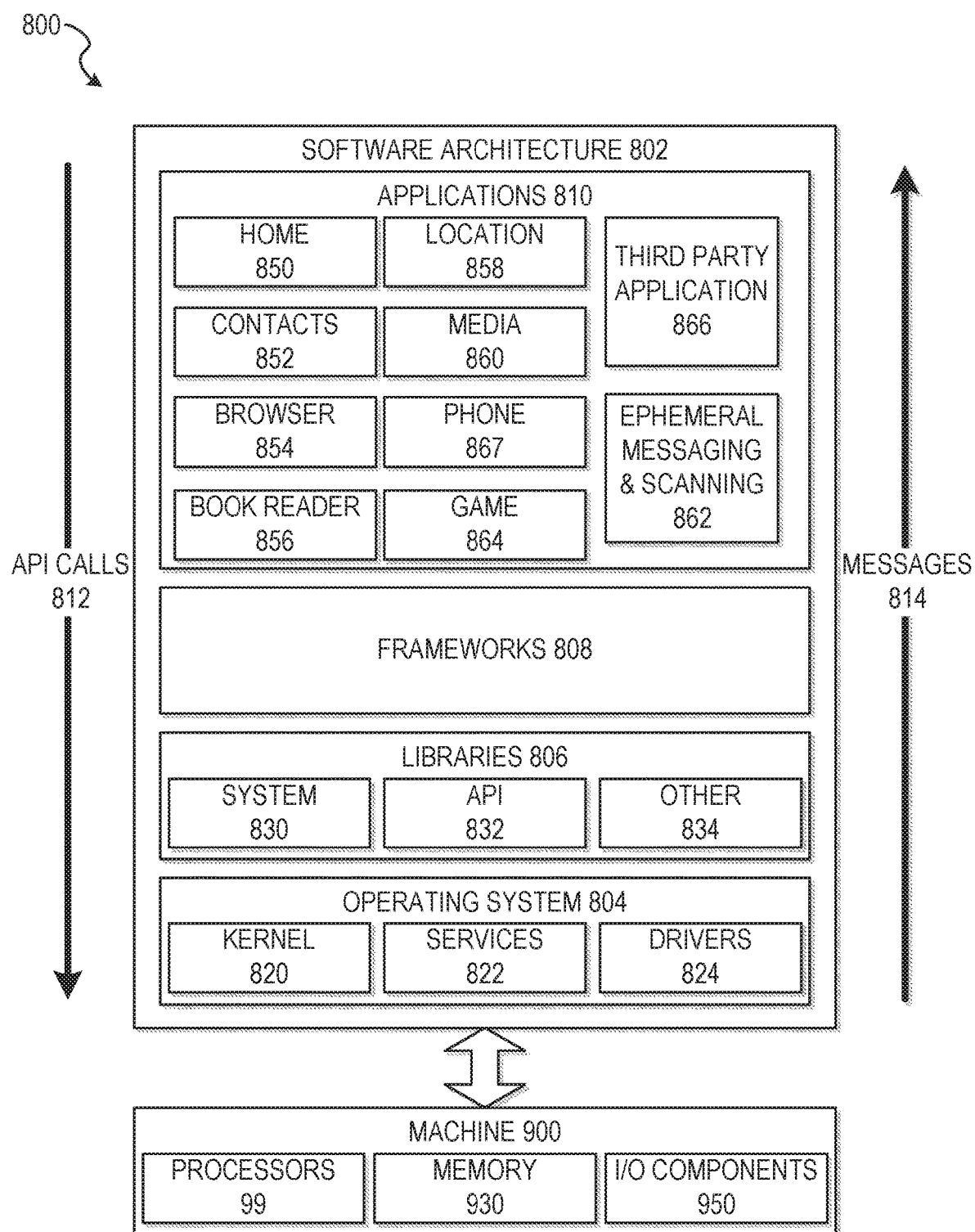
FIG. 8 describes a software architecture which may be used with some example embodiments.

FIG. 8 is a block diagram 800 illustrating a representative software architecture 802, which may be used in conjunction with various hardware architectures herein described. FIG. 8 is merely a non-limiting example of a software architecture and it will be appreciated that many other architectures may be implemented to facilitate the functionality described herein. The software architecture 802 may be executing on hardware such as machine 900 of FIG. 9 that includes, among other things, processors 910, memory 930, and input/output (I/O) components 950. A representative hardware layer 804 is illustrated and can represent, for example, the machine 900 of FIG. 9. The representative hardware layer 804 comprises one or more processing units 806 having associated executable instructions 808. Executable instructions 808 represent the executable instructions of the software architecture 802. Hardware layer 804 also includes memory and/or storage modules 810, which also have executable instructions 808. Hardware layer 804 may also comprise other hardware as indicated by 812, which represents any other hardware of the hardware layer 804, such as the other hardware illustrated as part of machine 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 and/or other components within the layers may invoke API calls 824 through the software stack and receive a response, returned values, and so forth illustrated as messages 826 in response to the API calls 824. The layers illustrated are representative in nature and not all software architectures have all layers. For example, some mobile or special purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware 818 (also sometimes referred to as middleware) may provide a higher-level common infrastructure that may be utilized by the applications 820 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 820 and/or other software components/modules, some of which may be specific to a particular operating system or platform.

The applications 820 include built-in applications 840 and/or third party applications 842. Examples of representative built-in applications 840 may include, but are not limited to, a contacts application, a browser application, a book reader application, a location application, a media application, a messaging application, and/or a game application. Third party applications 842 may include any of the built in applications 840 as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 842 may invoke the API calls 824 provided by the mobile operating system such as operating system 814 to facilitate functionality described herein.

The applications 820 may utilize built in operating system functions (e.g., kernel 828, services 830, and/or drivers 832), libraries (e.g., system 834, APIs 836, and other libraries 838), and frameworks/middleware 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware machine (such as the machine of FIG. 9, for example). A virtual machine is hosted by a host operating system (operating system 814 in FIG. 8) and typically, although not always, has a virtual machine monitor 846, which manages the operation of the virtual machine 848 as well as the interface with the host operating system (i.e., operating system 814). A software architecture executes within the virtual machine 848 such as an operating system 850, libraries 852, frameworks/middleware 854, applications 856, and/or presentation layer 858. These layers of software architecture executing within the virtual machine 848 can be the same as corresponding layers previously described or may be different.

Figure 9:
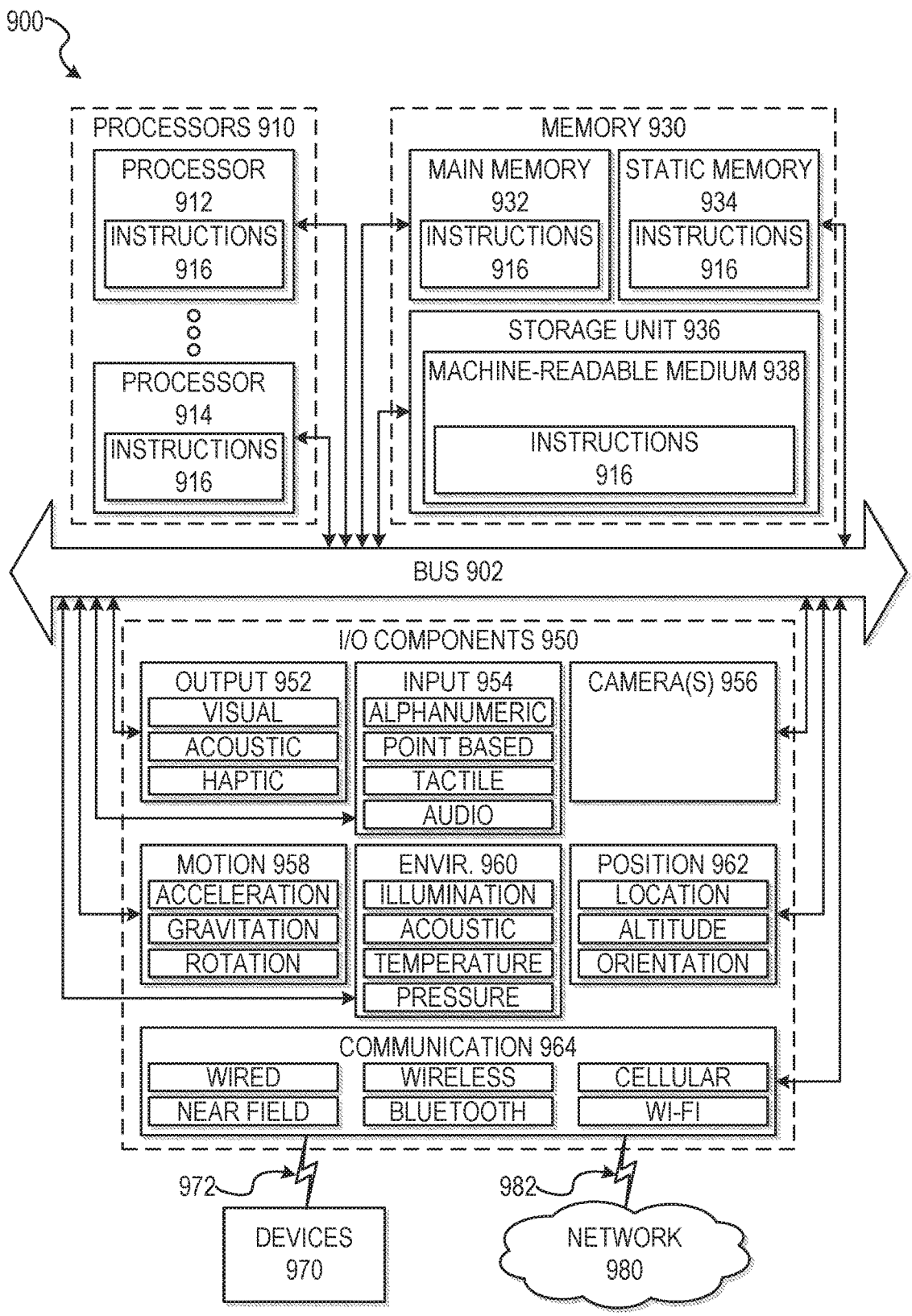
FIG. 9 describes a device which may be used to implement aspects of some example embodiments.

FIG. 9 is a block diagram illustrating components of a machine 900, according to some example embodiments, able to read instructions (e.g., processor-executable instructions) from a machine-readable medium (e.g., a non-transitory machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute elements of the diagrams of FIG. 7, or of any method described herein. Additionally, or alternatively, the instructions 916 may implement various modules described herein. In some embodiments, these modules may be distributed across multiple machines as a virtual or distributed implementation of the respective module. The instructions 916 transform the general, non-programmed machine into a particular machine programmed to carry out the described and illustrated functions in the manner described. In alternative embodiments, the machine 900 operates as a stand-alone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a vehicle integrated computer, a server computer, a client computer, a personal computer (PC), a tablet computer, a laptop computer, a netbook, a wearable device, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory 930 may include a main memory 932, static memory 934, or other memory storage, and a storage unit 936, both accessible to the processors 910 such as via a bus 902. Storage unit 936 may include or comprise one embodiment of a machine-readable medium 938. In some embodiments, the storage unit 936, main memory 932, and static memory 934 store the instructions 916 embodying any one or more of the methodologies or functions described herein. In other embodiments, the instructions 916 may also reside, completely or partially, within the main memory 932, within the storage unit 936, within at least one of the processors 910 (e.g., within the processor's cache memory), or any suitable combination thereof, during execution thereof by the machine 900. Accordingly, the main memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include cameras 956, motion components 958, environmental components 960, or position components 962 among a wide array of other components. Some embodiments may include biometric components which may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972, respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geo-location, location via Wi-Fi® signal triangulation, location via detecting a NFC beacon signal that may indicate a particular location, and so forth.

The instructions 916, embodied as processor executable instructions, can provide an algorithmic and programmatic expression of any above-referenced modules or structures and enable the modules to perform the methodologies described herein. The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer implemented method performed at a server, the method comprising:
   receiving, during a given time period, search input from a device comprising a prefix string, the prefix string including an incomplete search string;
   identifying a plurality of categories associated with the prefix string;
   determining that a given category of the plurality of categories is associated with greater temporal demand during previous repeated time periods that correspond to the given time period;
   prioritizing search results associated with the prefix string such that a first search result associated with the given category is prioritized over a second search result associated with another category of the plurality of categories; and
   transmitting the first search result to the device.

2. The method of claim 1, wherein the given time period is one year and each of the repeated time periods is one week, further comprising:
   for each category of the plurality of categories, identifying a percentage of all user inputs associated with that category for each time period of the previous repeated time periods;
   identifying one or more time periods of the previous repeated time periods where a probability of all user inputs associated with a first category deviates from an expected value by more than a threshold amount; and
   selecting the one or more time periods where the probability of all user inputs associated with the first category deviates from the expected value by more than the threshold amount.

3. The method of claim 1 further comprising generating, for display, the prioritized search results in response to receiving the search input during the given time period, wherein the given time period is associated with a triggering event.

4. The method of claim 1 further comprising:
   receiving user inputs in an autocomplete database as part of an autocomplete model; and
   associating each user input of the received user inputs with one or more categories and with one of a plurality of time segments of a repeated considered time period in order to build a temporal model capturing temporal demand for the one or more categories.

5. The method of claim 4 further comprising:
determining that a history of percentages of all searches are associated with a particular category over time, wherein the plurality of time segments comprises a first time segment, and wherein during the first time segment a first category of the one or more autocomplete categories is associated with a deviation from an average number of user inputs for the repeated considered time period.

6. The method of claim 5 further comprising creating a set of autocomplete results using the temporal model, wherein the set of autocomplete results is based at least in part on the search input being received during the first time segment.

7. The method of claim 1, wherein each of the plurality of categories is identified, at least in part, by metadata.

8. The method of claim 1, wherein:
each of the plurality of categories is a lowest level leaf category within a category tree structured with multiple tiers of categories;
each lowest level leaf category within the category tree is associated with one or more search strings within a database; and
each of a plurality of received user inputs is associated with the plurality of categories by accessing the database and comparing each user input with the one or more search strings of each lowest level leaf category.

9. The method of claim 8 further comprising:
associating the plurality of categories and the prefix string using a first set of match scores ranking an expected relationship between the prefix string and one or more autocomplete categories;
wherein the first set of match scores is weighted based on a determination that the given category receives the greater than average number of user inputs during a first time period when compared with the average number of user inputs for a considered time period.

10. The method of claim 9 further comprising comparing characters of a query string for each of the user inputs and metadata associated with each of the user inputs with metadata for each lowest level leaf category.

11. A non-transitory computer readable medium comprising computer readable instructions that, when executed by one or more processors, causes a system to perform operations comprising:
receiving, during a given time period, search input from a device comprising a prefix string, the prefix string including an incomplete search string;
identifying a plurality of categories associated with the prefix string;
determining that a given category of the plurality of categories is associated with greater temporal demand during previous repeated time periods that correspond to the given time period;
prioritizing search results associated with the prefix string such that a first search result associated with the given category is prioritized over a second search result associated with another category of the plurality of categories; and
transmitting the first search result to the device.

12. The non-transitory computer readable medium of claim 11, wherein the given time period is one year and each of the repeated time periods is one week, and wherein the operations further comprise:
for each category of the plurality of categories, identifying a percentage of all user inputs associated with that category for each time period of the previous repeated time periods;
identifying one or more time periods of the previous repeated time periods where a probability of all user inputs associated with a first category deviates from an expected value by more than a threshold amount; and
selecting the one or more time periods where the probability of all user inputs associated with the first category deviates from the expected value by more than the threshold amount.

13. The non-transitory computer readable medium of claim 11, wherein the operations further comprise generating, for display, the prioritized search results in response to receiving the search input during the given time period, wherein the given time period is associated with a triggering event.

14. The non-transitory computer readable medium of claim 11, wherein the operations further comprise:
receiving user inputs in an autocomplete database as part of an autocomplete model; and
associating each user input of the received user inputs with one or more categories and with one of a plurality of time segments of a repeated considered time period in order to build a temporal model capturing temporal demand for the one or more categories.

15. The non-transitory computer readable medium of claim 14, wherein the operations further comprise determining that a history of percentages of all searches are associated with a particular category over time, wherein the plurality of time segments comprises a first time segment, and wherein during the first time segment a first category of the one or more autocomplete categories is associated with a deviation from an average number of user inputs for the repeated considered time period.

16. The non-transitory computer readable medium of claim 15, wherein the operations further comprise creating a set of autocomplete results using the temporal model, wherein the set of autocomplete results is based at least in part on the search input being received during the first time segment.

17. The non-transitory computer readable medium of claim 11, wherein each of the plurality of categories is identified, at least in part, by metadata.

18. The non-transitory computer readable medium of claim 11, wherein:
each of the plurality of categories is a lowest level leaf category within a category tree structured with multiple tiers of categories;
each lowest level leaf category within the category tree is associated with one or more search strings within a database; and
each of a plurality of received user inputs is associated with the plurality of categories by accessing the database and comparing each user input with the one or more search strings of each lowest level leaf category.

19. The non-transitory computer readable medium of claim 18, wherein the operations further comprise:
associating the plurality of categories and the prefix string using a first set of match scores ranking an expected relationship between the prefix string and one or more autocomplete categories;
wherein the first set of match scores is weighted based on a determination that the given category receives the greater than average number of user inputs during a first time period when compared with the average number of user inputs for a considered time period.

20. A system comprising:

a memory for storing instructions; and one or more processors executing the instructions stored in the memory for performing operations comprising:

receiving, during a given time period, search input from a device comprising a prefix string, the prefix string including an incomplete search string;

identifying a plurality of categories associated with the prefix string;

determining that a given category of the plurality of categories is associated with greater temporal demand during previous repeated time periods that correspond to the given time period;

prioritizing search results associated with the prefix string such that a first search result associated with the given category is prioritized over a second search result associated with another category of the plurality of categories; and transmitting the first search result to the device.

* * * * *